(12) United States Patent
Scott

(10) Patent No.: US 6,470,759 B1
(45) Date of Patent: Oct. 29, 2002

(54) LOAD CELL WITH REDUCED SENSITIVITY TO THERMAL SHOCK

(75) Inventor: Jon Scott, Greenville, SC (US)

(73) Assignee: Mettler Toledo, Inc., Columbus, OH (US)

( * ) Notice: Subject to any disclaimer, the term of this patent is extended or adjusted under 35 U.S.C. 154(b) by 0 days.

(21) Appl. No.: 09/699,727

(22) Filed: Oct. 30, 2000

(51) Int. Cl.[7] ................................................. G01L 1/16
(52) U.S. Cl. ................................ 73/862.639; 73/795
(58) Field of Search ........................... 73/774, 775, 781, 73/788, 795, 796, 805, 806, 818, 826, 841, 847, 856, 862.639

(56) References Cited

U.S. PATENT DOCUMENTS 4,064,744 A * 12/1977 Kistler ........................ 73/88.5
4,125,168 A * 11/1978 Ormond ...................... 177/211
4,520,679 A * 6/1985 Hatamura
4,546,838 A * 10/1985 Ormond ...................... 177/211
4,558,756 A * 12/1985 Seed .......................... 177/211
4,785,673 A * 11/1988 Aumard .................... 73/862.65
6,122,846 A * 9/2000 Gray et al. ................... 36/136

* cited by examiner

Primary Examiner—Max Noori
(74) Attorney, Agent, or Firm—Jeffrey Furr

(57) ABSTRACT

A load cell has internal cuts or grooves allowing increased the measurable strain on a load cell package increasing its ability to accurately measure lower weights while reducing the load cell's sensitivity to thermal shock. These cuts or grooves are rectangular slots with circular ends and run parallel to the load cell. The cuts or grooves are cut into the gage-hole producing ridges. The strain gauges are located on the middle ridge which is a thicker wall which reduces the temperature differences between the gauges, causing the cell to generate less output during a thermal shock. Not only is the output due to thermal shock smaller, but it lasts for a shorter period of time.

17 Claims, 5 Drawing Sheets

LOAD CELL WITH REDUCED SENSITIVITY TO THERMAL SHOCK

CROSS-REFERENCES TO RELATED APPLICATIONS (IF ANY)

None

STATEMENT AS TO RIGHTS TO INVENTIONS MADE UNDER FEDERALLY-SPONSORED RESEARCH AND DEVELOPMENT (IF ANY)

None

BACKGROUND

1. Field of the Invention

This invention relates to load cells and more particularly to a load cell that provides more strain at lower weights and has reduced sensitivity to thermal shock.

2. Description of Prior Art

A load cell used to measure applied loads often uses resistance strain gauges wired into a Wheatstone bridge on the inside of the gage-holes. These strain gauges measure the strain placed on the load cell by changing resistance in response to the change in strain by an applied load. This resistance is measured. This measured resistance in then converted into a weight figure.

There is a desire and need to achieve lower weighing capacities in a larger load cell package size. This gives a company the ability to stretch a standard package size downward in capacity, while using the same barstock, processes, methods, etc., for the larger package size. Using the same package size for more capacities gives the company more buying power of barstock (buying more of one size) and reduces the amount of new processes that are needed. It is cheaper to have the ability to minimize the number of differences in a product line.

To create the ability of a load cell to read at lower weight capacities, material is removed from the load cell to increase the strain on the load cell to allow for accurate readings by the strain gauges.

The current art is to remove the material from the exterior of the load cell. This sculpting requires an elaborate machining operation and renders the cell more sensitive to thermal transients. The cross sectional area of the remaining material becomes very small at low capacities and this small cross sectional area is a poor heat conduit, creating a large temperature gradient across the sculpted region. The poor heat conduction also causes this gradient to last for a longer time than it would if the cross sectional area were larger.

Milling is a cheap process and a preferred method to be used, but the current art weakens the outside of the cell; this has the load cell so weakened that it is too flimsy for milling so an expensive EDM operation must be used. Some additional fixturing may be used to stiffen the cell enough for milling, but the cost of production goes up.

The current art also makes it difficult to create lower weight capacity hermetically sealed load cells. A round through-hole for the load cell is convenient, as it allows easy gauging and an inexpensive round cover for hermetic sealing. To achieve a 250 lb capacity, the current art abandons the round hole, as there isn't enough material left on the cell's exterior to remove. The 250 lb cell uses an elliptical hole with potting for environmental protection. Part of the reason for the potting is that it's difficult to obtain good performance for a round hermetic cover in a 250 lb cell, but another reason is that an elliptical cover is more expensive. It's harder to make an elliptical cover and it's more expensive to weld the elliptical shape.

The addition of the ability to achieve lower weighing capacities for a load cell while reducing sensitivity to thermal shock and the need for hermetic sealing leaves room for improvement within the art.

1. Field of the Invention

U.S. Class 177/211

2. Description of Related Art Including Information Disclosed Under 37 CFR §1.97** > and 1.98<.

SUMMARY OF THE INVENTION

An object of the present invention is to provide a means to achieve lower weighing capacities in a relatively large load cell barstock size while reducing the load cell's sensitivity to thermal shock.

The inventor of the present invention has increased the measurable strain on a load cell package increasing its ability to accurately measure lower weights while reducing the load cell's sensitivity to thermal shock. According to one aspect of the present invention, it has been discovered that the removal of material from the interior of the load cell produces the ability of the load cell to accurately measure strains at lower weights and applied loads while reducing the sensitivity of the load cell to thermal shock.

The current invention produces a stiffer load cell than the current methods with thick, stiff sections next to thin sections. The thin sections reduce the overall stiffness enough to get the strain levels that are desired, but the thick section have enough moments of inertia to keep the cell from becoming flimsy. This allows the load cell to be milled, which is a less expensive process than those currently being used.

The present invention is less sensitive to thermal shock. This is due to the fact the material under the strain gauges is thicker than the current art. The current art has the strain gauges mounted on a section of reduced stiffness by design, as the strains are higher in reduced sections. However, a reduced section conducts heat poorly, causing a large temperature difference between the strain gauges which lasts for a long time. The present invention has gauges mounted on a thicker section which conducts heat better, causing a smaller temperature difference which lasts for a shorter time.

The size and depth of the grooves produce the desired overall stiffness to get the strain levels while counterbalancing the need to reduce thermal sensitivity.

The current invention allows for the lower weight measurement hermetically sealed load cells. It allows for the maintaining of a round gage-hole for low-cost strain gauging and for low-cost hermetic sealing.

By removing material from the inside of the load cell within the gage-hole, the Inventor has added the ability to achieve lower weighing capacities for a load cell while reducing sensitivity to thermal shock and allowing for hermetically sealing all at a reduced cost.

BRIEF DESCRIPTION OF THE DRAWINGS

Without restricting the full scope of this invention, the preferred form of this invention is illustrated in the following drawings.

DESCRIPTION OF THE PREFERRED EMBODIMENT(S)

Figure 1:
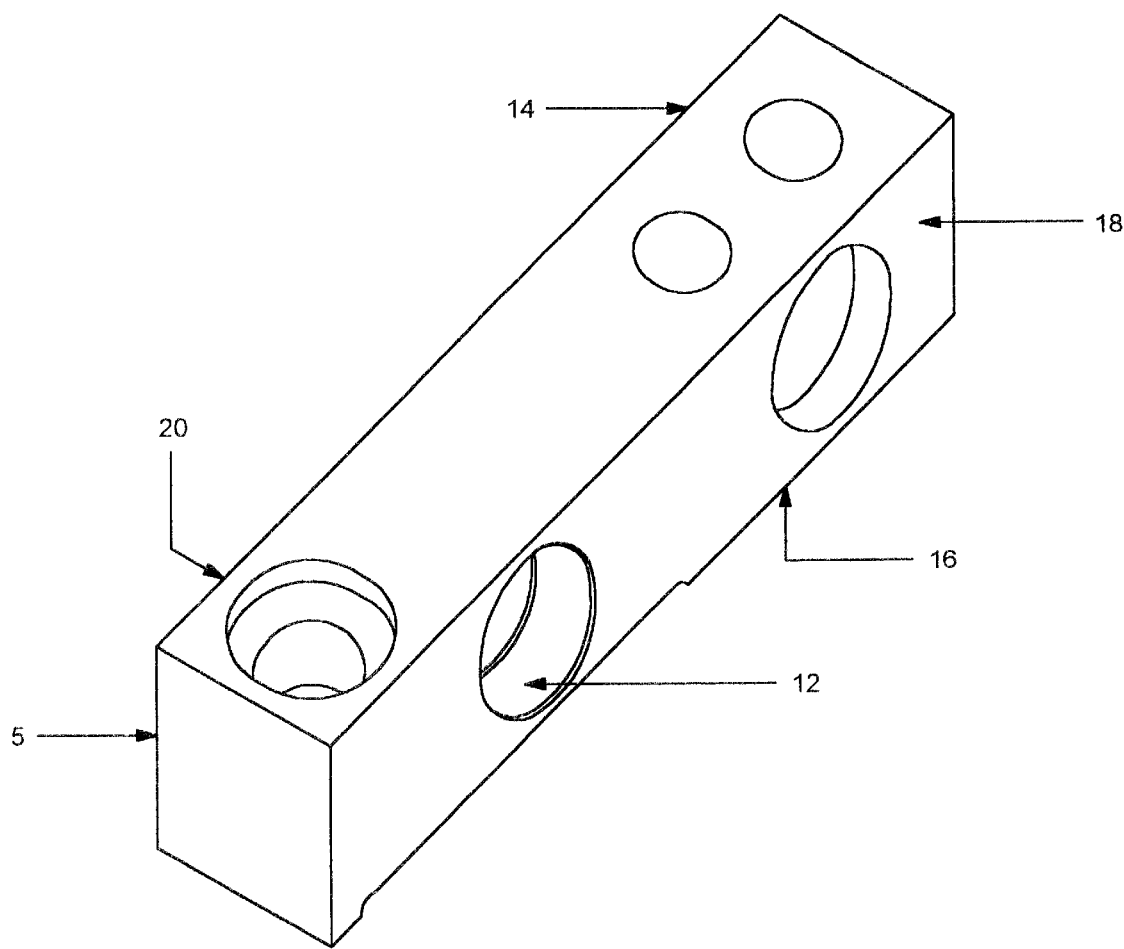
FIG. 1 is a side elevational view of a load cell embodying the present invention.

Referring initially to FIG. 1, there is shown a elevational side view of the load cell, denoted as 5, embodying the present invention. The load cell scale 5 includes strain gauges 10. The strain gauges 10 are of the type whose resistance changes with strain and are normally wired into a Wheatstone bridge in order to produce a signal proportional to the applied load. They are commonly and commercially available. The load cell 5 would also include associated electronic circuitry (not shown) for processing the signal from the strain gauges 10. Load cell 5 is made out of a Barstock which is preferably made of stainless steel, but can be constructed of aluminum or other suitable materials.

The load cell 5 is made of a rectangular barstock. The load cell 5 has material removed through machining to form a circular gage-hole 12. The gage-hole 12 is perpendicular to the length of the top side 14 and bottom side 16 of the load cell 5 and runs from the left side 18 and right side 20 of the load cell 5. The gage-hole 12 serves to weaken the load cell 5 to increase the strain so that it can accurately measure the weight on the load cell 5 produced by an applied load. The gage-hole 12 is also the preferred location to mount the strain gauge(s) 10. As displayed in FIG. 1, FIG. 2, and FIG. 5 the strain gauges 10 are located on the top and the bottom of the gage-hole 12.

Figure 2:
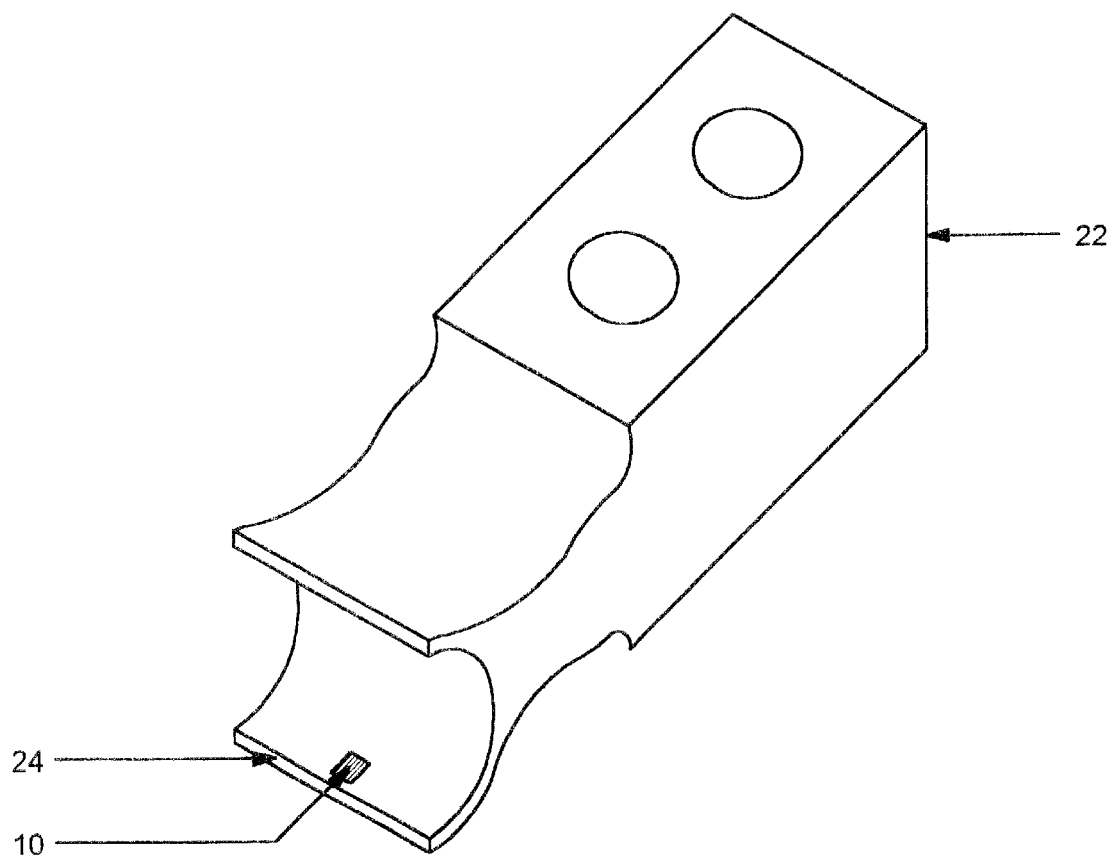
FIG. 2 is a side elevational cross-section view of a load cell embodying the current art.
Figure 3:
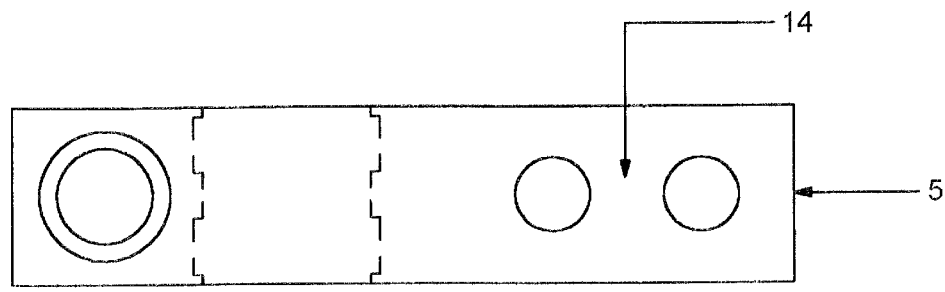
FIG. 3 is a top view of the current invention.
Figure 4:
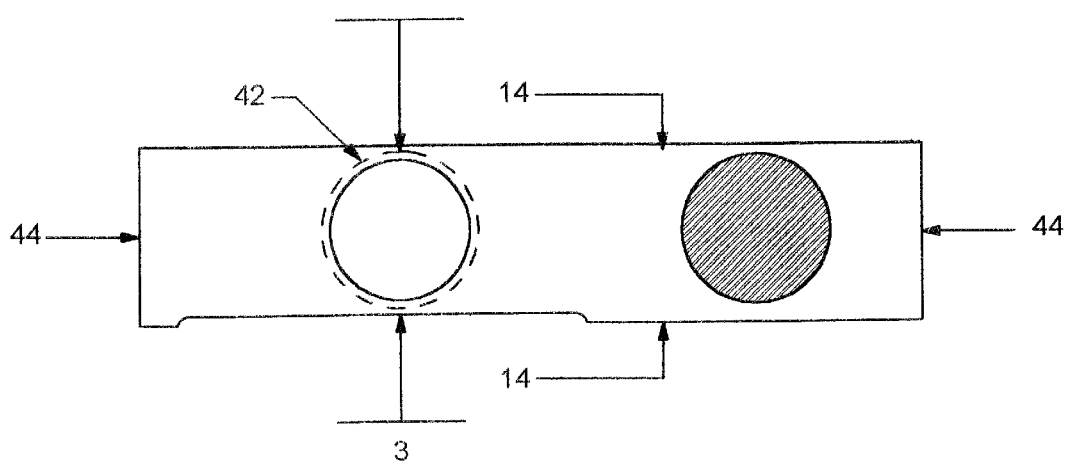
FIG. 4 is a side view of the current invention.

FIG. 2 shows the current art. The current art load cell 22 has material removed from its exterior. The strain gauges 10 are located in an area of the current art load cell 22 that has a section of reduced stiffness 24. This is by design, as the strains are higher in reduced sections. However, a reduced section 24 conducts heat poorly compared to a thicker section, so that the strain gauges 10 placed on the reduced section 24 are often at very different temperatures from one another and very sensitive to thermal changes.

Figure 5:
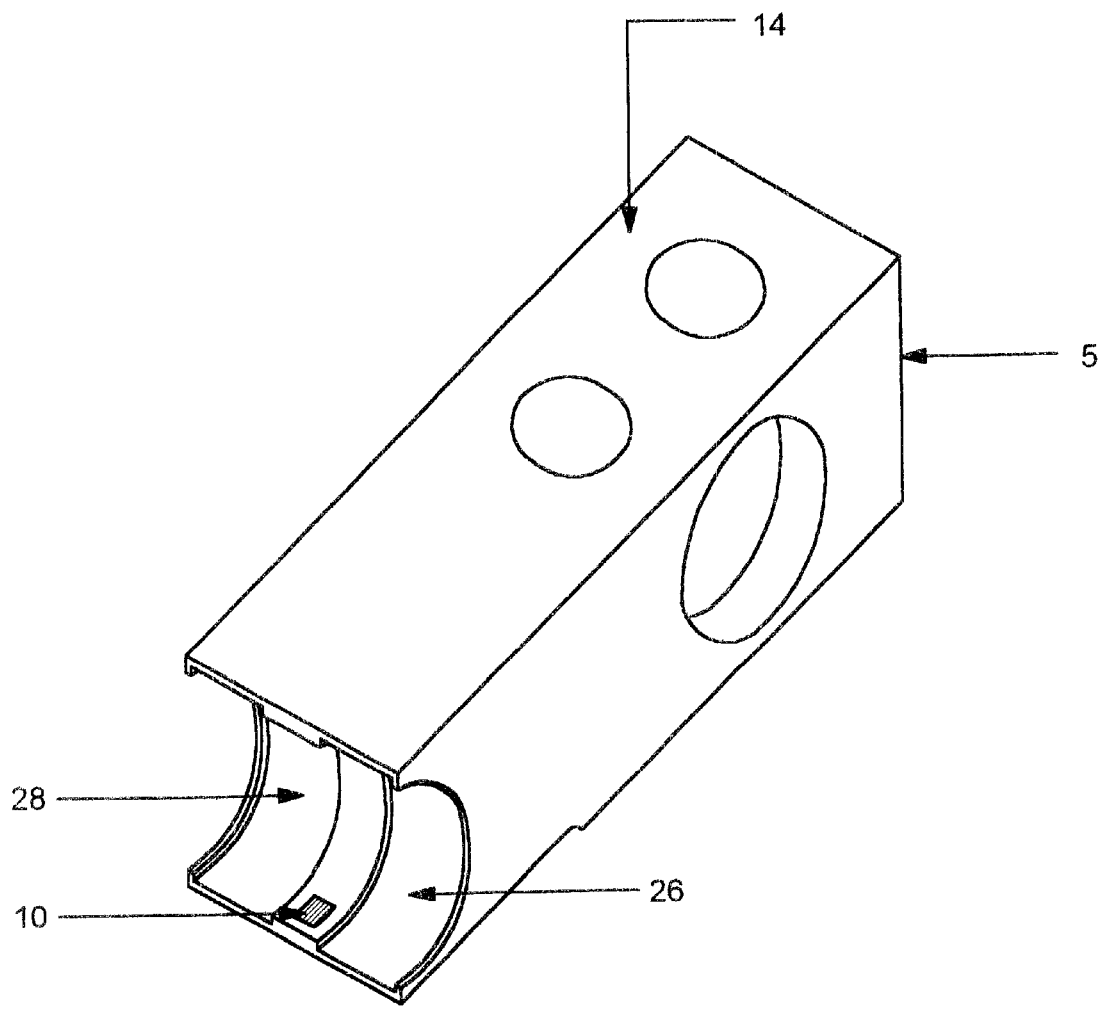
FIG. 5 is a side elevational cross-section view of a load cell in the direction of the arrows 3—3 of FIG. 4 embodying the current invention.
Figure 6:
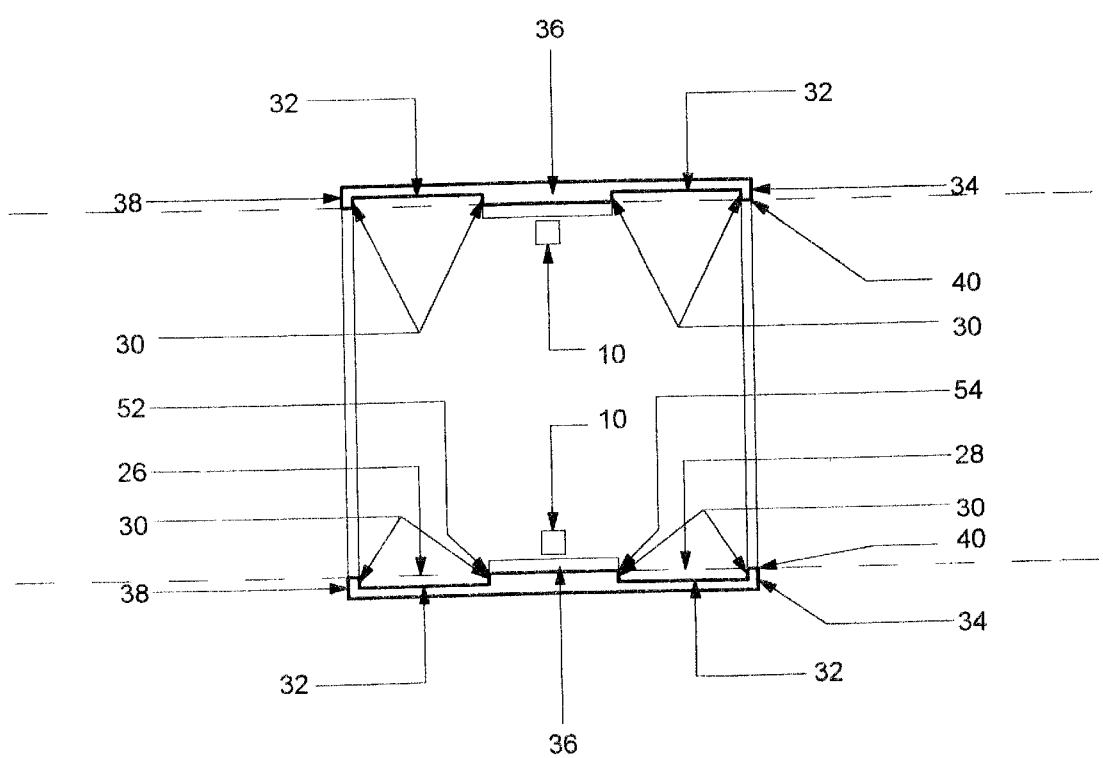
FIG. 6 is an end view of the load cell in the direction of the arrows 3—3 of FIG. 4.

As displayed in the cross-cut section in FIG. 5, the current invention has material removed from the interior of the load cell 5. The removed material forms two grooves, a left valley 26 and right valley 28. As shown in the end view of FIG. 6, the valleys are formed by the valley sides 30 and valley bottoms 32. The valleys form a right ridge 34, a thick ridge 36 and a left ridge 38 in the gage-hole surface 40.

The grooves are created by a milling process which removes the required material from the gage-hole surface 40. Enough material is removed from the load cell's interior to give it the proper amount of strain desired to produce accurate readings for the lower applied weight countermeasured against the desire to have thick enough material under the strain gauges 10 to produce the desired reduction in thermal sensitivity, as described below. The preferred design for a 500 lb load cell has material removed from the gage-hole surface 40 so that the grooves widths are 0.42 inches. The grooves are cut so that the thick ridge 36 has a width of 0.29 inches and the right ridge 34 and left ridge 38 both have a width of 0.04 inches. The grooves are cut to form a maximum valley bottom 32 depth of 0.583 inches and a minimum depth of 0.521 inches forming a straight slot with semicircular ends 42. The slot 42 would have the same midpoint as the gage-hole 12 with the minimum depth being at the point in which the slot is near the top side 14 and bottom side 16 of the load cell 5. This is to produce the proper strain on the load cell 5 without causing the load cell 5 to become too flimsy. The maximum depth of the slot 42 would be at those points of the slot 42 that would be closest to the load cell ends 44. The left valley 26 and the right valley 28 are cut parallel to each other and perpendicular to the gage-hole surface 40.

The current invention has the strain gauges 10 on the thick ridge 36 of the load cell 5. There are two strain gauges 10 on the top and two strain gauges 10 on the bottom. These positions provide the proper strain to accurately measure the applied load.

The position on the thick ridge 36 is important to the reduction of sensitivity of the load cell 5 to thermal shock. The thick ridge 36 is a better conductor of heat and is a bigger conduit in which heat can be transferred. This allows the material under the strain gauges 10 to stabilize quicker making it come to a thermal equilibrium faster than the thinner material in the current art. The temperature difference between the two gauges on top is smaller during the stabilization transient than the current art. Likewise, the temperature difference between the two bottom gauges is also smaller during the stabilization time than in the current art.

The current invention allows for lower weight measurement hermetically sealed load cells 5. The gage-hole 12 is circular. This allows for low-cost strain gauging 10 placement as the process can be automated. The circular gage-hole 12 also allow for lower cost hermetic sealing for load cells 5 that can accurately measure the strain by lower weight applied loads. A round gage-hole 12 for the load cell is convenient, as it allows for an inexpensive round cover for hermetic sealing. The current art on the 250 lb bars uses elliptical gage-holes which are difficult and expensive to hermetically seal.

Additional Embodiments

One additional embodiment, would be for the material being removed to use another shape in which slots or holes are created internally in the load cell 5 in order to produce the desired strain at the lower weighing capacities.

Operation

In use, the load cell 5 is fixed rigidly at one end and a load to be measured applied at the other end through a scale platter or similar device (not shown). The applied load causes load cell 5 to flex or bend in a known manner and the strain gauges 10 to produce an electrical signal indicative of the load applied.

Advantages

The previously described embodiments of the present invention including achieving lower weighing capacities for a load cell using standard barstock while reducing its sensitivity to thermal shock and allowing for hermetically sealing of lower weight load cells.

Although the present invention has been described in considerable detail with reference to certain preferred versions thereof, other versions are possible. For example, the size and depth of the groove cuts could be different, different barstock could be used, a material removal means besides milling could be used, different types of strain gauges or force transducers could be used or the gauges could be located at a different location on the load cell. Therefore, the point and scope of the appended claims should not be limited to the description of the preferred versions contained herein. While this invention has been described above in connection with a single beam load cell employing strain gages, it will be appreciated that it is applicable to essentially any load cell and may employ force transducers other than strain gages.

What is claimed is:

1. A cantilever beam assembly for a load cell comprising a longitudinally extending support beam having opposed sidewalls, a plurality of adjacent parallel and independent openings extending completely through the sidewalls of said beam forming gage hole(s), said beam completely surrounding each of said independent and parallel openings, a vertical web between said two openings with material removed from a plurality of gage holes by a material removal means to form two valleys, a left valley and a right valley, that are parallel to each other and to the length of the load cell; and three ridges, a left ridge, a right ridge and a thick ridge are formed by the left and right valleys with the left ridge being on the left side of the load cell, the right ridge being on the right side of the load cell and the thick ridge being between the left and right valleys; and, one or more strain gauges mounted on the thick ridge.

2. A device as claimed in claim 1 wherein:
  a) said material removed from a plurality of gage hole(s) by a material removal means to form two valleys, a left valley and a right valley, that are parallel to each other and to the length of the load cell, and which maximizes the desired strain versus the decreased thermal sensitively;
  b) three ridges, a left ridge, a right ridge and a thick ridge are formed by the left and night valleys with the left ridge being on the left side of the load cell, the right ridge being on the right side of the load cell and the thick ridge being between the left and right valleys; and,
  c) one or more strain gauges mounted on the thick ridge, load cell has strain gauges connected to the gage-hole.

3. A device as claimed in claim 1, wherein said load cell is hermetically sealed.

4. A cantilever beam assembly for a load cell comprising a longitudinally extending support beam having opposed sidewalls, two adjacent parallel and independent openings extending completely through the sidewalls of said beam forming a plurality of gage hole(s), said beam completely surrounding each of said independent and parallel openings, a vertical web between said two openings with material removed from a plurality of gage hole(s) by a material removal means to form two valleys, a left valley and a right valley, that are parallel to each other and to the length of the load cell: and three ridges, a left ridge, a right ridge and a thick ridge are formed by the left and right valleys with the left ridge being on the left side of the load cell, the right ridge being on the right side of the load cell and the tlick ridge being between the left and right valleys; and, and one or more strain gauges mounted on the thick ridge.

5. A device as claimed claim 4 wherein said material is removed from a plurality of gage hole(s) in which the valleys form the shape of a slot with circular ends.

6. A device as claimed in claim 4 wherein said material is removed from a plurality of gage hole(s) in which the valleys form the shape of a slot with circular ends which maximizes the desired strain versus the decrease in thermal sensitivity.

7. A device as claimed in claim 4 wherein said material is removed from a plurality of gage hole(s) maximizes the desired strain versus the decrease in thermal sensitivity.

8. A device as claimed in claim 4 wherein said load cell is hermetically sealed.

9. A process consisting of the steps of:
  a) removing material form a plurality of gage hole(s) of a cantilever beam assembly for a load cell comprising a longitudinally extending support beam having opposed sidewalls, two adjacent parallel and independent openings extending completely through the sidewalls of said beam forming gage holes through a material removal means to form two valleys, a left valley and a right valley, that are parallel to each other and to the length of the load cell; and
  b) having three ridges, a left ridge, a right ridge and a thick ridge formed by the valley with the left ridge being on the left side of the load cell, the right ridge being on the right side of the load cell and the thick ridge being between the two valleys.

10. A process as claimed in claim 9 wherein said material is removed from a plurality of gage hole(s).

11. A process as claimed in claim 9 wherein said material is removed from a plurality of gage hole(s) in the valleys form the shape of a slot with circular ends.

12. A process as claimed in claim 9 wherein said material is removed from a plurality of gage hole(s) in the valleys form the shape of a slot with circular ends which maximizes the desired strain versus the decrease in thermal sensitivity.

13. A process as claimed in claim 9 wherein said material is removed internally which maximizes the desired strain versus the decrease in thermal sensitivity.

14. A process as claimed in claim 9 wherein said material is removed internally from a plurality of gage hole(s) which maximizes the desired strain versus the decreased thermal sensitivity.

15. A process as claimed in claim 9 wherein said material removal means is milling.

16. A device comprising an item produced by the process in claim 9.

17. A cantilever beam assembly for a load cell comprising a longitudinally extending support beam having opposed sidewalls, a parallel and independent opening extending completely through the sidewalls of said beam forming a plurality of gage hole(s), said beam completely surrounding each of said independent and parallel openings, a vertical web between said two openings with material removed from a plurality of gage hole(s) by a material removal means to form two valleys, a left valley and a right valley, that are parallel to each other and to the length of the load cell; and three ridges, a left ridge, a right ridge and a thick ridge are formed by the left and right valleys with the left ridge being on the left side of the load cell, the right ridge being on the right side of the load cell and the thick ridge being between the left and right valleys; and, one or more strain gauges mounted on the thick ridge.

* * * * *